US006264484B1

United States Patent
Chien et al.

(10) Patent No.: US 6,264,484 B1
(45) Date of Patent: Jul. 24, 2001

(54) DOCKING STATION FOR A NOTEBOOK COMPUTER WITH A DOWNWARDLY ORIENTED DOCKING CONNECTOR

(75) Inventors: Chung-Chi Chien; Shih-Chung Kuan; Tan-Jui Ting, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/523,977

(22) Filed: Mar. 13, 2000

(51) Int. Cl.[7] .................................................. H01R 13/62
(52) U.S. Cl. ............................................ 439/152; 361/686
(58) Field of Search .................................. 439/152, 155, 439/159, 160; 361/686

(56) References Cited

U.S. PATENT DOCUMENTS

| | | | | |
|---|---|---|---|---|
| 5,406,456 | * | 4/1995 | Hsu ........................................ | 361/752 |
| 5,627,727 | * | 5/1997 | Aguilera et al. ...................... | 361/686 |
| 5,687,060 | * | 11/1997 | Ruch et al. ............................ | 361/686 |
| 5,737,541 | * | 4/1998 | Shimizu et al. ...................... | 710/101 |

OTHER PUBLICATIONS

IBM Technical Disclosure Bulletin vol. 38, No. 8 (Aug. 1995).*

* cited by examiner

*Primary Examiner*—Brian Sircus
*Assistant Examiner*—Michael C. Zarroli
(74) *Attorney, Agent, or Firm*—Pillsbury Winthrop LLP

(57) ABSTRACT

A docking station is adapted for use with a notebook computer with a downwardly oriented docking connector. The top side of the housing of the docking station has an upwardly oriented electrical connector which is adapted for mating with the docking connector in a in a vertical direction. An ejector is mounted in the housing, and is movable upwardly and downwardly for placement and removal of the notebook computer. A rotary shaft is mounted to the housing, and is coupled to the ejector for moving the ejector for placement and removal of the computer in the docking station. An operating member is mounted on the housing, and is coupled to the rotary shaft. The operating member is operable from an exterior of the housing for rotating the rotary shaft.

5 Claims, 6 Drawing Sheets

DOCKING STATION FOR A NOTEBOOK COMPUTER WITH A DOWNWARDLY ORIENTED DOCKING CONNECTOR

BACKGROUND OF THE INVENTION

1. Field of the Invention

The invention relates to a docking station for a notebook computer with a downwardly oriented docking connector, more particularly to a docking station which can retain a notebook computer securely and which is easily operable to eject the notebook computer.

2. Description of the Related Art

A docking station is commonly used for docking a notebook computer so as to permit connection of the notebook computer with various computer peripheral equipment. FIG. 1 illustrates a conventional docking station which includes abase 10 having a top side formed with a computer holding portion 100 for holding a notebook computer (not shown). The base 10 is provided with an electrical connector 101 at one side of the computer holding portion 100 for mating with a docking connector on a rear side of the notebook computer. The base 10 is further provided with limiting members 102 at the other three sides of the computer holding portion 100. However, as the space between the electrical connector 101 and an opposite one of the limiting members 102 is fixed, it is relatively difficult to extend a notebook computer into the computer holding portion 100 and to register the docking connector precisely with the electrical connector 101 during installation of the notebook computer. It is also difficult for a person to apply a force for removing the notebook computer from the computer holding portion 100.

FIG. 2 illustrates another conventional docking station for a notebook computer. The docking station includes a base 11 having a top side formed with a computer holding portion 110, a pair of lateral limiting members 112 formed on lateral sides of the computer holding portion 110, and an electrical connector 111 for mating with a docking connector provided on a rear side of the notebook computer. Since the docking station is not provided with a limiting member for limiting a front side of the notebook computer, the notebook computer can be easily extended into and removed from the computer holding portion 110 of the docking station. However, the connection between the electrical connector 111 and the docking connector of the notebook computer might not be secure enough. Moreover, when the notebook computer is to be removed from the docking station of FIG. 2, the limiting members 112 should be moved outwardly away from each other to facilitate removal of the docking connector from the electrical connector in a forward direction.

Moreover, neither of the aforementioned docking stations can be used for a notebook computer having a downwardly oriented docking connector provided on a bottom side thereof.

SUMMARY OF THE INVENTION

Therefore, the main object of the present invention is to provide a docking station for a notebook computer with a downwardly oriented docking connector.

Accordingly, the docking station of the present invention is adapted for use with a notebook computer having a bottom side provided with a downwardly oriented docking connector, and includes a housing, an ejector member, a rotary shaft, and an operating member. The housing has a top side provided with an upwardly oriented electrical connector which is adapted for mating with the docking connector of the notebook computer in a vertical direction. The ejector member is mounted in the housing, and is movable upwardly and downwardly between an ejecting position in which the ejector member abuts against the bottom side of the notebook computer and applies an upward pushing force to the notebook computer, and a retracting position, in which the ejector member moves away from the bottom side of the notebook computer. The rotary shaft is mounted in the housing, and is coupled to the ejector member. The rotary shaft is rotatable in a first direction for moving the ejector member to the ejecting position and in a second direction opposite to the first direction for moving the ejector member to the retracting position. The operating member is mounted on the housing, and is coupled to the rotary shaft. The operating member is operable from an exterior of the housing for rotating the rotary shaft in the first and second directions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
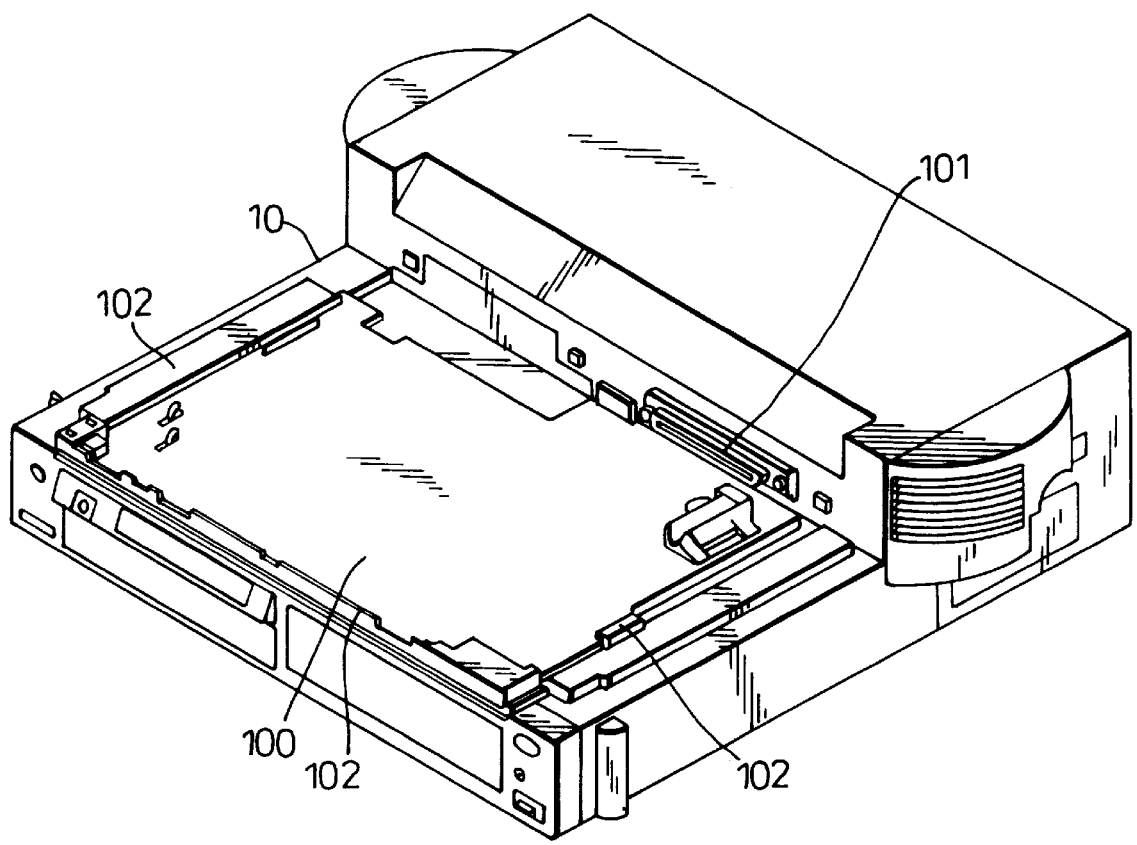
FIG. 1 is a perspective view of a conventional docking station for a notebook computer.
Figure 2:
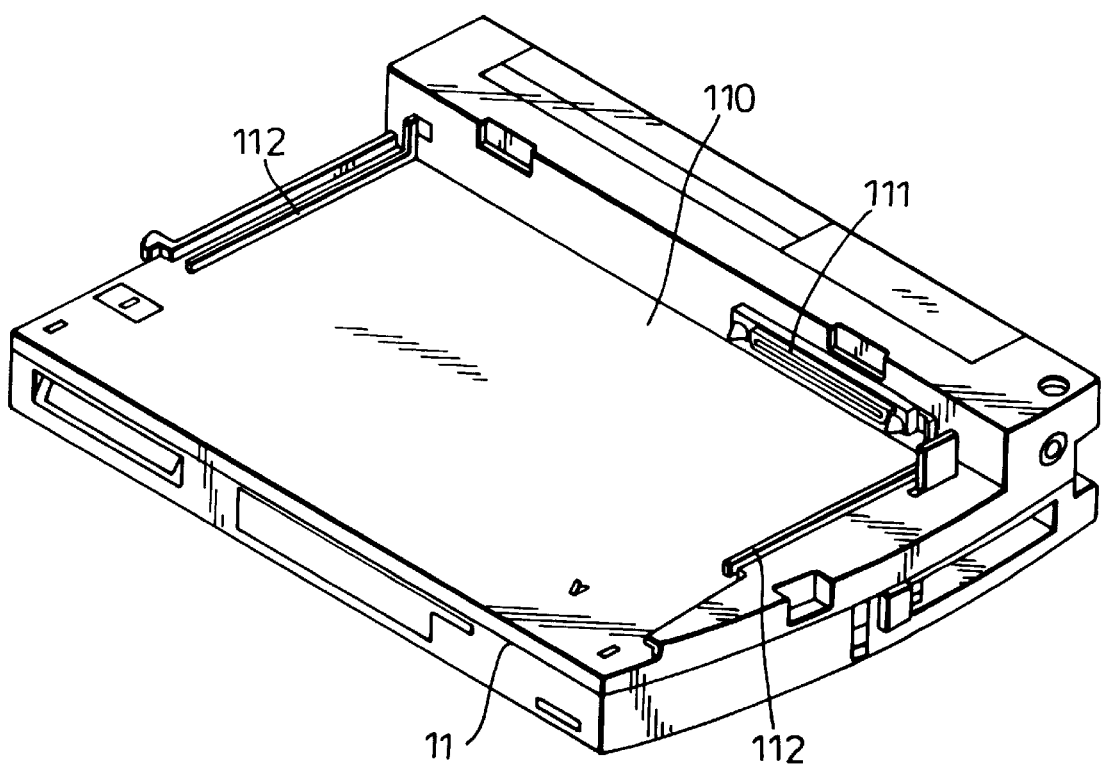
FIG. 2 is a perspective view of another conventional docking station for a notebook computer.
Figure 3:
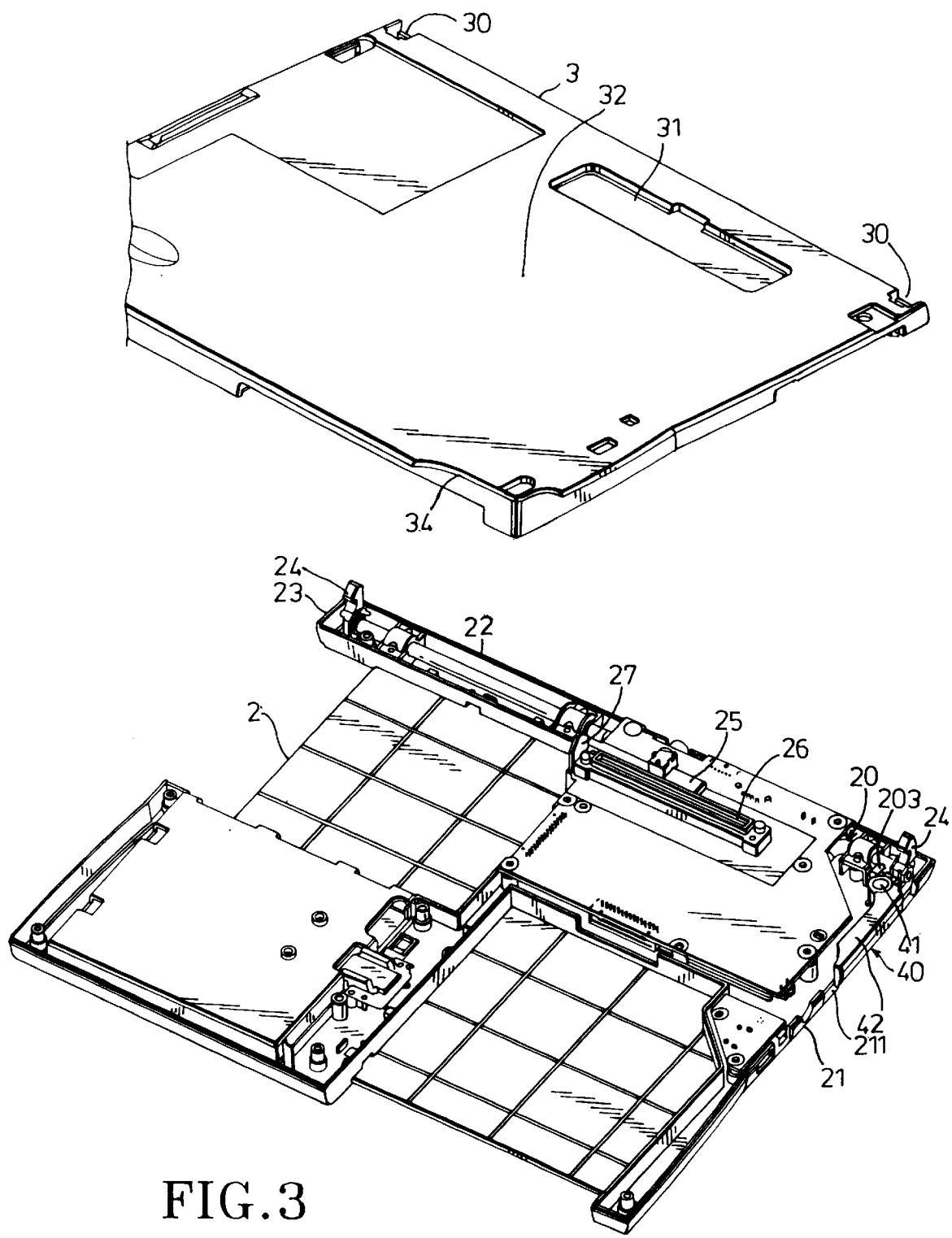
FIG. 3 an exploded perspective view of a preferred embodiment of the docking station of the present invention.
Figure 4:
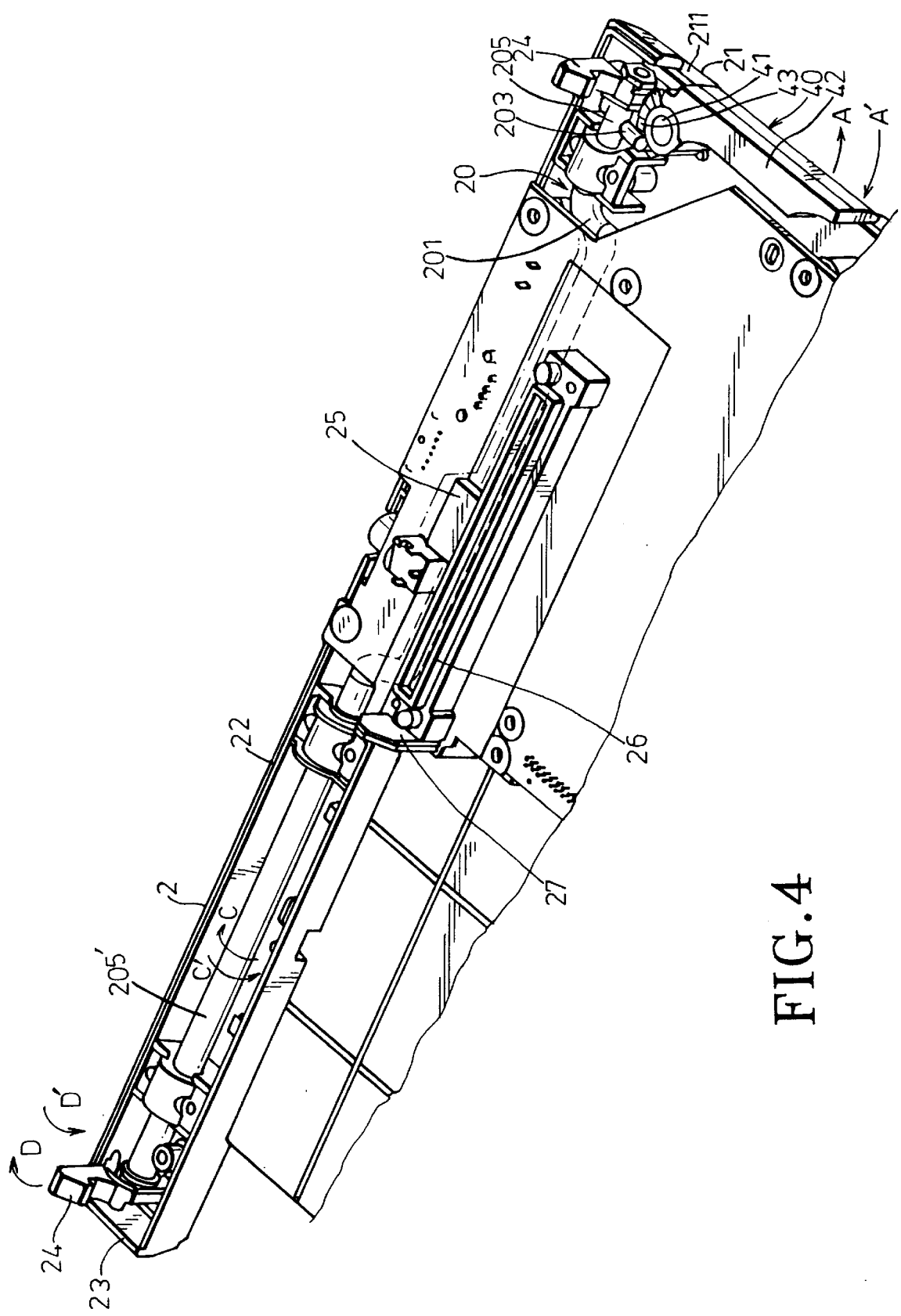
FIG. 4 is a fragmentary perspective view of a base member of the preferred embodiment, illustrating how an operating member can be operated to move an ejector member.

The docking station of the present invention is adapted for docking a notebook computer (not shown) having a bottom side provided with a downwardly oriented docking connector. Referring to FIGS. 3 and 4, the docking station of the preferred embodiment of the present invention is shown to include a housing having a base member 2 and a cover member 3, an ejector member 25, a rotary shaft 20, and an operating member 40.

The base member 2 has a top side provided with an upwardly oriented electrical connector 26 that is adapted for mating with the docking connector of the notebook computer in a vertical direction. The top side is further provided with an upward guiding plate 27 adjacent to the electrical connector 26 and adapted to extend toward the bottom side of the notebook computer for aligning the docking connector of the notebook computer with the electrical connector 26 of the base member 2 so as to guide connection between the electrical connector 26 and the docking connector of the notebook computer.

The rotary shaft 20 is disposed on the base member 2 adjacent to a rear edge 22 of the latter, and includes a U-shaped section 201, and a pair of aligned lateral sections 205, 205' which are connected to opposite ends of the U-shaped section 201 and which are mounted rotatably on the base member 2 such that the U-shaped section 201 is pivotable relative to the base member 2 about an axis of the lateral sections 205, 205'. A pair of upwardly extending engaging members 24 are provided on opposite ends of the rotary shaft 20 adjacent to left and right edges 23, 21 of the base member 2 for co-rotation with the rotary shaft 20. The ejector member 25 is provided on the U-shaped section 201 of the rotary shaft 20 so as to be movable upwardly and downwardly with the U-shaped section 201 when the rotary shaft 20 is rotated about the axis of the lateral sections 205, 205'. A right side one of the lateral sections 205 is formed with a cylindrical transverse projection 203.

The operating member 40 is disposed on the base member 2 adjacent to the right edge 21 of the latter, and has a mounting end portion 41 mounted rotatably on the base member 2 about a vertical axis, and a lever portion 42 extending from the mounting end portion 41. The base member 2 has an outer side wall surface formed with a notch 211 within which the lever portion 42 is disposed to permit operation of the lever portion 42 from an exterior of the housing. The operating member 40 further has an upwardly curving step portion 43 which extends around the mounting end portion 41 and which curves upwardly in a clockwise direction about the mounting end portion 41. The transverse projection 203 of the rotary shaft 20 rests on the step portion 43. The lever portion 42 is operable to pivot about the vertical axis so as to turn the step portion 43 about the vertical axis. When the lever portion 42 is operated to move in a direction (A) outwardly of the notch 211, the step portion 43 pushes the transverse projection 203 upwardly so as to rotate the rotary shaft 20 in a first direction (C). At this time, the ejector member 25 moves upwardly with the U-shaped section 201 of the rotary shaft 20 to an ejecting position, in which the ejector member 25 abuts against the bottom side of the notebook computer and applies an upward pushing force to the notebook computer to facilitate disengagement of the docking connector of the notebook computer from the electrical connector 26 of the docking station. When the lever portion 42 is operated to move in a direction (A') inwardly of the notch 211, the transverse projection 203 is permitted to move downwardly along the step portion 43 so as to rotate the rotary shaft 20 in a second direction (C') opposite to the first direction (C). At this time, the ejector member 25 moves downwardly with the U-shaped section 201 to a retracting position, in which the ejector member 25 moves away from the bottom side of the notebook computer and ceases to apply the pushing force. In addition, when the lever portion 42 is operated in the direction (A) to rotate the rotary shaft 20 in the direction (C), the engaging members 24 turn in a rearward direction (D) with the rotary shaft 20 away from the top side of the base member 2 to facilitate installation and removal of the notebook computer. When the lever portion 42 is operated in the direction (A') to rotate the rotary shaft 20 in the direction (C'), the engaging members 24 turn in a forward direction (D') with the rotary shaft 20 so as to be adapted to engage a rear edge of the notebook computer.

The cover member 3 is mounted on top of the base member 2, and has a top side 32 adapted for placing of the notebook computer thereon. The cover member 3 has a rear edge formed with a pair of notches 30 for extension of the engaging members 24, and is formed with an opening 31 that permits extension of the electrical connector 26 and the guiding plate 27 therethrough and projection of the ejector member 25 therefrom for movement to the ejecting position. The cover member 3 further has a front edge formed with a pair of upwardly extending limiting flanges 34 (only one is shown) for limiting a front edge of the notebook computer. In the present embodiment, the limiting flanges 34 are L-shaped and are formed at corner portions of the front edge opposite to the notches 30, respectively.

Figure 5:
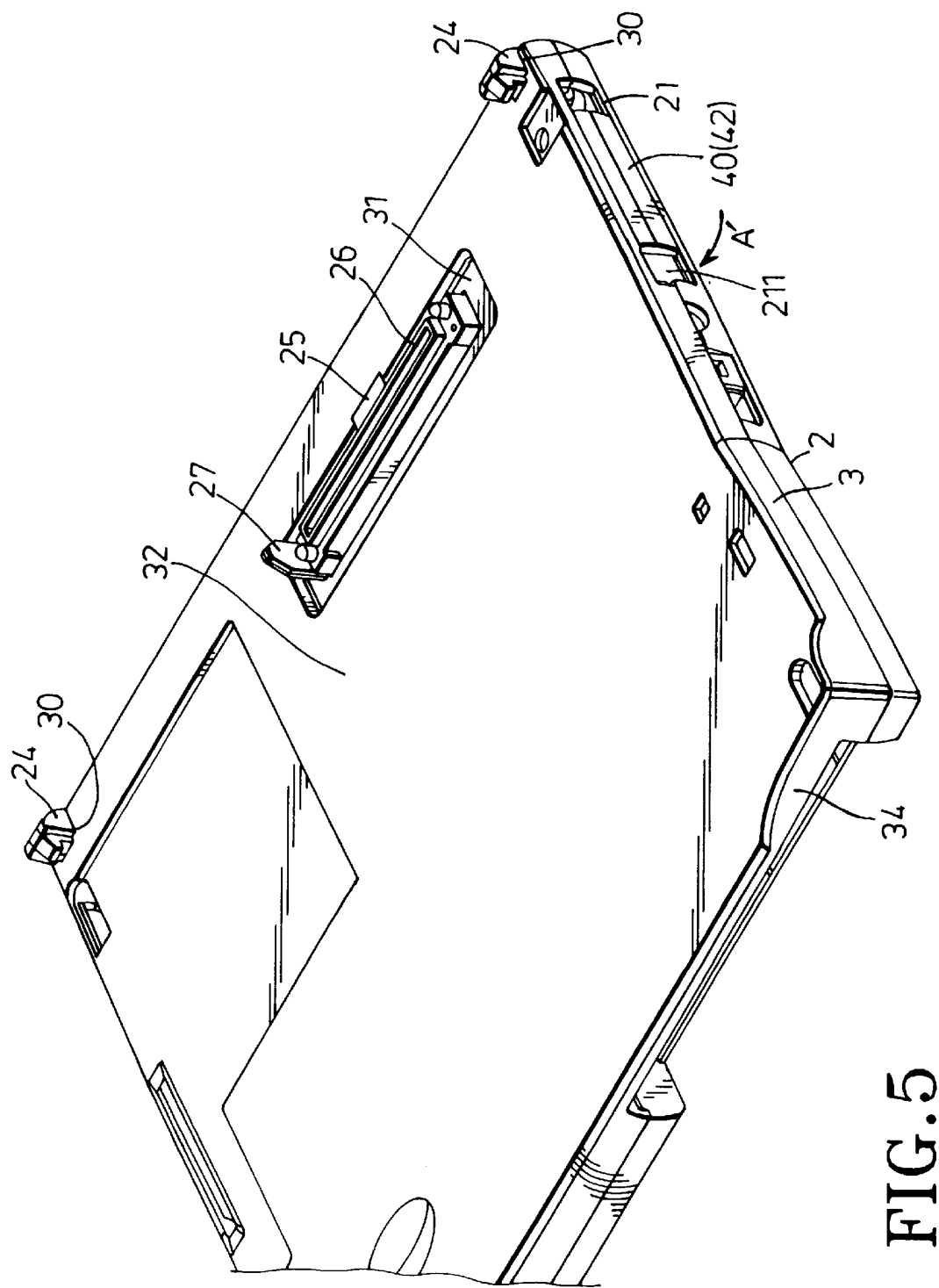
FIG. 5 is a perspective view of the preferred embodiment when the ejector member is in a retracting position and FIG. 6 is a perspective view of the preferred embodiment when the ejector member is in an ejecting position.
Figure 6:
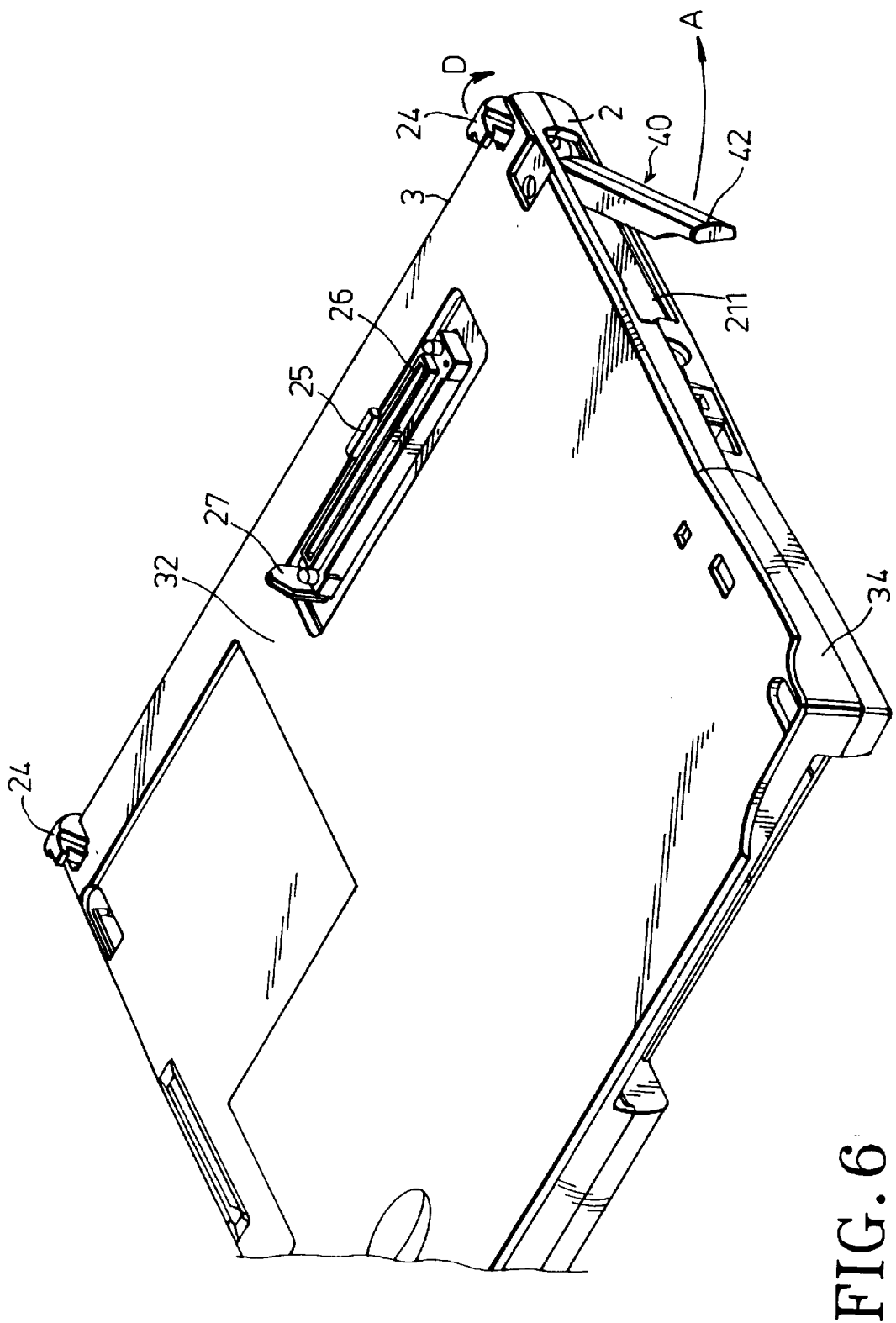

In use, referring to FIGS. 5 and 6, the lever portion 42 of the operating member 40 is operated in the direction (A) to turn the engaging members 24 in the rearward direction (D) away from the top side of the housing. The notebook computer (not shown) is then disposed on the top side 32 of the cover member 3, allowing the docking connector of the notebook computer to mate with the electrical connector 26, and allowing the guiding plate 27 to extend toward the bottom side of the notebook computer. Thereafter, the lever portion 42 of the operating lever 40 is operated to move in the direction (A') toward the notch 211 so as to turn the engaging members 24 forwardly for engaging the rear edge of the notebook computer. When it is desired to detach the notebook computer from the docking station of the preferred embodiment, the lever portion 42 is operated once again in the direction (A) to turn the engaging members 24 rearwardly for disengaging from the notebook computer and to enable the ejector member 25 to move upwardly to the ejecting position so as to apply an upward pushing force to the notebook computer to facilitate disengagement of the docking connector of the notebook computer from the electrical connector 26.

Therefore, by simply operating the operating member 40, the notebook computer can be installed securely on the docking station of the preferred embodiment and can be easily removed from the same.

In the present embodiment, the operating lever 40 is coupled to the rotary shaft 20 by means of the upwardly curving step portion 43 and the transverse projection 203 resting on the step portion 43. However, the present invention is not limited to the illustrated manner for coupling the operating lever 40 to the rotary shaft 20. Other alternatives for coupling the operating lever 40 to the rotary shaft 20 are available as long as the operating member 40 is operable to cause rotation of the rotary shaft 20 about the axis of the lateral sections 205, 205'.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A docking station for a notebook computer having a bottom side provided with a downwardly oriented docking connector, said docking station comprising:

a housing having a top side provided with an upwardly oriented electrical connector adapted for mating with the docking connector of the notebook computer in a vertical direction;

an ejector member mounted in said housing and movable upwardly and downwardly between an ejecting position in which said ejector member abuts against the bottom side of the notebook computer and applies an upward pushing force to the notebook computer, and a retracting position, in which said ejector member moves away from the bottom side of the notebook computer;

a rotary shaft mounted in said housing and coupled to said ejector member, said rotary shaft being rotatable in a first direction for moving said ejector member to said ejecting position and in a second direction opposite to the first direction for moving said ejector member to said retracting position;

an operating member mounted on said housing and coupled to said rotary shaft, said operating member being operable from an exterior of said housing for rotating said rotary shaft in the first and second directions, wherein said rotary shaft includes a U-shaped section with opposite ends, and a lateral section connected to one of said ends of said U-shaped section, said rotary shaft being rotatable relative to said housing about an axis of said lateral section, said ejector member being mounted on said U-shaped section and being movable between the ejecting and retracting position when said rotary shaft is rotated.

2. The docking station of claim 1, wherein said operating lever has a mounting end portion mounted pivotally on said housing about a vertical axis, a lever portion extending from said mounting end portion and disposed outwardly of said housing, and an upwardly curving step portion extending around said mounting end portion, said lateral section of said rotary shaft having a transverse projection resting on said step portion, said lever portion being operable to pivot about the vertical axis to enable said step portion to push said transverse projection upwardly so as to rotate said rotary shaft in the first direction, and to permit said transverse projection to move downwardly along said step portion so as to rotate said rotary shaft in the second direction.

3. The docking station of claim 2, wherein said housing has an outer side wall surface formed with a notch, said lever portion being disposed in said notch to permit operation thereof from the exterior of said housing.

4. A docking station for a notebook computer having a bottom side provided with a downwardly oriented docking connector, said docking station comprising:

a housing having a top side provided with an upwardly oriented electrical connector adapted for mating with the docking connector of the notebook computer in a vertical direction;

an ejector member mounted in said housing and movable upwardly and downwardly between an ejecting position in which said ejector member abuts against the bottom side of the notebook computer and applies an upward pushing force to the notebook computer, and a retracting position, in which said ejector member moves away from the bottom side of the notebook computer;

a rotary shaft mounted in said housing and coupled to said ejector member, said rotary shaft being rotatable in a first direction for moving said ejector member to said ejecting position an in a second direction opposite to the first direction for moving said ejector member to said retracting position; and an operating member mounted on said housing and coupled to said rotary shaft, said operating member being operable from an exterior of said housing for rotating said rotary shaft in the first and second directions, wherein said housing is further provided with an upward guiding plate which is adapted to extend toward the bottom side of the notebook computer for guiding connection between said electrical connector of said housing and the docking connector of the notebook computer.

5. The docking station of claim 4, wherein said housing includes a base member provided with said electrical connector and said guiding plate, and a cover member mounted on a top side of said base member and adapted for placing the notebook computer thereon, said cover member being formed with an opening to permit extension of said electrical connector and said guiding plate and movement of said ejector member to the ejecting position.

* * * * *